(12) United States Patent
Parampottil et al.

(10) Patent No.: US 10,686,935 B1
(45) Date of Patent: Jun. 16, 2020

(54) FRAUD DETECTION FOR CONTROLLED-ENVIRONMENT FACILITY COMMUNICATIONS SYSTEM

(71) Applicant: Securus Technologies, Inc., Carrollton, TX (US)

(72) Inventors: Isaac Parampottil, Coppell, TX (US); Dennis Eugene Rose, Carrollton, TX (US); David McTee, Hurst, TX (US); Dean Ramsey, Dallas, TX (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

(21) Appl. No.: 16/173,159

(22) Filed: Oct. 29, 2018

(51) Int. Cl.
  *H04M 3/22* (2006.01)
  *H04M 3/42* (2006.01)

(52) U.S. Cl.
  CPC ....... *H04M 3/2281* (2013.01); *H04M 3/2218* (2013.01); *H04M 3/42102* (2013.01)

(58) Field of Classification Search
  None
  See application file for complete search history.

(56) References Cited

U.S. PATENT DOCUMENTS

| | | | | |
|---|---|---|---|---|
| 7,881,446 B1* | 2/2011 | Apple | | H04M 15/08 379/114.21 |
| 9,923,936 B2* | 3/2018 | Hodge | | H04M 3/2281 |
| 10,129,392 B1* | 11/2018 | Hodge | | H04M 3/2281 |
| 2007/0242658 A1* | 10/2007 | Rae | | H04M 3/2281 370/352 |
| 2013/0263227 A1* | 10/2013 | Gongaware | | H04L 63/08 726/4 |
| 2013/0331061 A1* | 12/2013 | Byrne | | H04W 12/00 455/410 |

* cited by examiner

*Primary Examiner* — Quoc D Tran
(74) *Attorney, Agent, or Firm* — Fogarty LLP

(57) ABSTRACT

Methods and systems provide a controlled-environment facility communication system that provides regulated communication sessions between residents and non-residents. Via a supervisory system, a bypass may be authorized for exempting the communication session from various regulated aspects of sessions regulated by the communication system. For instance, a communication may be exempt from monitoring based on assertions that the communication is privileged. The communications system receives a request for a communication session with a non-resident at a first telephone number. If a communication session is authorized by a bypass authorization, the communication session is hosted, while exempt from the regulations specified by the bypass authorization. A monitoring system tracks the hosted bypass communication session by determining whether telephone numbers other than the first telephone number have been joined to the communication session. These joined telephone numbers may be used to identify unauthorized communications by the resident.

20 Claims, 4 Drawing Sheets

FRAUD DETECTION FOR CONTROLLED-ENVIRONMENT FACILITY COMMUNICATIONS SYSTEM

TECHNICAL FIELD

The following description relates generally to communication services provided to residents of a controlled-environment facility, and more particularly to detection of fraudulent use of regulated communication services provided to residents of a controlled-environment facility.

BACKGROUND OF THE INVENTION

It is estimated that over two million individuals are incarcerated in U.S. prisons and jails. In general, inmates that have been convicted of felony offenses serve longer sentences in prisons (e.g., federal or state prisons), whereas inmates that have been convicted of misdemeanors receive shorter sentences that are frequently served in local jails (e.g., county jail). In addition, upon being detained by authorities, an inmate may serve significant periods of time incarcerated in a local jail while awaiting release on bond and, in some cases, while awaiting trial. During all of these periods of incarceration, an inmate may be provided with opportunities to communicate with the outside world.

By allowing inmates to communicate with friends and family while incarcerated, the justice system aims to facilitate their transition back into society upon release. Traditional visitation sessions provided by controlled-environment facilities include telephone calls and in-person visits. More recently, technological advances have allowed controlled-environment facilities to provide various types of remote, interactive communications sessions as visitation sessions, including voice and video conferences, text communications, email and online chat sessions.

These communication sessions allow residents to communicate with friends and family members, as well as to participate in various types of educational, training, and counseling sessions. Accordingly, such communication sessions are facilitated and encouraged by the controlled environment facility. However, fraudulent procurement of such communication services may allow a resident to circumvent various regulated aspects of the supported communication sessions, in some instances allowing a resident to participate in unauthorized and potentially unmonitored communication sessions with a prohibited individual. Such fraud may be perpetrated by residents with the knowing or unknowing participation of staff members of the controlled environment facility.

BRIEF SUMMARY

In various embodiments, a system provides a resident of a controlled-environment facility with regulated communication services. The system includes: a plurality of resident devices available to the resident, wherein the resident devices may host regulated communication sessions between the resident and a plurality of non-residents and a supervisory system configurable to authorize a bypass of a plurality of regulated aspects of communication sessions supported by a resident communications system. The resident communications system is configured to: receive a request for a communication session from the resident operating a resident device; authorize use of the resident device by the resident for a communication session with a non-resident at a first telephone number; determine if the requested communication session is authorized by a bypass authorization, wherein the bypass authorization exempts the requested communication session from one or more of the regulated aspects of the regulated communication sessions; and if the requested communication session is authorized by a bypass, host the requested communication session and signal tracking of the communication session; and a monitoring system configured to track the communication session by determining whether telephone numbers other than the first telephone number are joined to the communication session.

In additional embodiments of the system, the supervisory system may authorize a bypass for a single call to the first telephone number. In additional embodiments of the system, the supervisory system may authorize a bypass for all calls to the first telephone number. In additional embodiments of the system, the one or more regulated aspects of communication sessions that may be bypassed include recording the communication sessions. In additional embodiments of the system, the one or more regulated aspects of communication sessions that may be bypassed include monitoring the content of the communication sessions. In additional embodiments of the system, the one or more regulated aspects of communication sessions that may be bypassed include requiring fees for the communication sessions. In additional embodiments of the system, the monitoring system is further configured to determine if any other hosted communications sessions concurrently hosted by the resident communications system are joined to the communication session.

In various additional embodiments, a method provides a resident of a controlled-environment facility with regulated communication services. The method includes: providing a plurality of resident devices to the resident, wherein the resident devices may host regulated communication sessions between the resident and a plurality of non-residents; authorizing, by a supervisory system, a bypass of a plurality of regulated aspects of communication sessions supported by a resident communications system; receiving, by the resident communications system, a request for a communication session from the resident operating a resident device; authorizing, by the resident communications system, use of the resident device by the resident for a communication session with a non-resident at a first telephone number; determining, by the resident communications system, if the requested communication session is authorized by a bypass authorization, wherein the bypass authorization exempts the requested communication session from one or more of the regulated aspects of the regulated communication sessions; if the requested communication session is authorized by a bypass, hosting, by the resident communications system, the requested communication session and signaling tracking of the communication session; and tracking, by a monitoring system, the communication session by determining whether telephone numbers other than the first telephone number are joined to the communication session.

In additional embodiments of the method, the supervisory system may authorize a bypass for a single call to the first telephone number. In additional embodiments of the method, the supervisory system may authorize a bypass for all calls to the first telephone number. In additional embodiments of the method, the one or more regulated aspects of communication sessions that may be bypassed include recording the communication sessions. In additional embodiments of the method, the one or more regulated aspects of communication sessions that may be bypassed include monitoring the content of the communication sessions. In additional embodiments of the method, the one or more regulated aspects of communication sessions that may be bypassed include requiring fees for the communication sessions. In additional embodiments of the method, the method further includes determining, by the monitoring system, whether any other hosted communications sessions concurrently hosted by the resident communications system are joined to the communication session.

In various additional embodiments, a plurality of computer-readable storage devices have program instructions stored thereon for providing a resident of a controlled-environment facility with regulated communication services. Upon execution by one or more processors, the program instructions cause the one or more processors to: authorize, via a supervisory system, a bypass of a plurality of regulated aspects of communication sessions supported by a resident communications system providing a plurality of resident devices to the resident, wherein the resident devices may host regulated communication sessions between the resident and a plurality of non-residents; receive, by the resident communications system, a request for a communication session from the resident operating a resident device; authorize, by the resident communications system, use of the resident device by the resident for a communication session with a non-resident at a first telephone number; determine, by the resident communications system, if the requested communication session is authorized by a bypass authorization, wherein the bypass authorization exempts the requested communication session from one or more of the regulated aspects of the regulated communication sessions; if the requested communication session is authorized by a bypass, host, by the resident communications system, the requested communication session and signaling tracking of the communication session; and track, by a monitoring system, the communication session by determining whether telephone numbers other than the first telephone number are joined to the communication session.

In additional embodiments of the storage device, the supervisory system may authorize a bypass for one or more of: a single call to the first telephone number and all calls to the first telephone number. In additional embodiments of the storage device, the one or more regulated aspects of communication sessions that may be bypassed include recording the communication sessions. In additional embodiments of the storage device, the one or more regulated aspects of communication sessions that may be bypassed include monitoring the content of the communication sessions. In additional embodiments of the storage device, the one or more regulated aspects of communication sessions that may be bypassed include requiring fees for the communication sessions. In additional embodiments of the storage device, the program instructions cause the one or more processors to determine, by the monitoring system, whether any other hosted communications sessions concurrently hosted by the resident communications system are joined to the communication session.

BRIEF DESCRIPTION OF THE DRAWINGS

Figure 1:
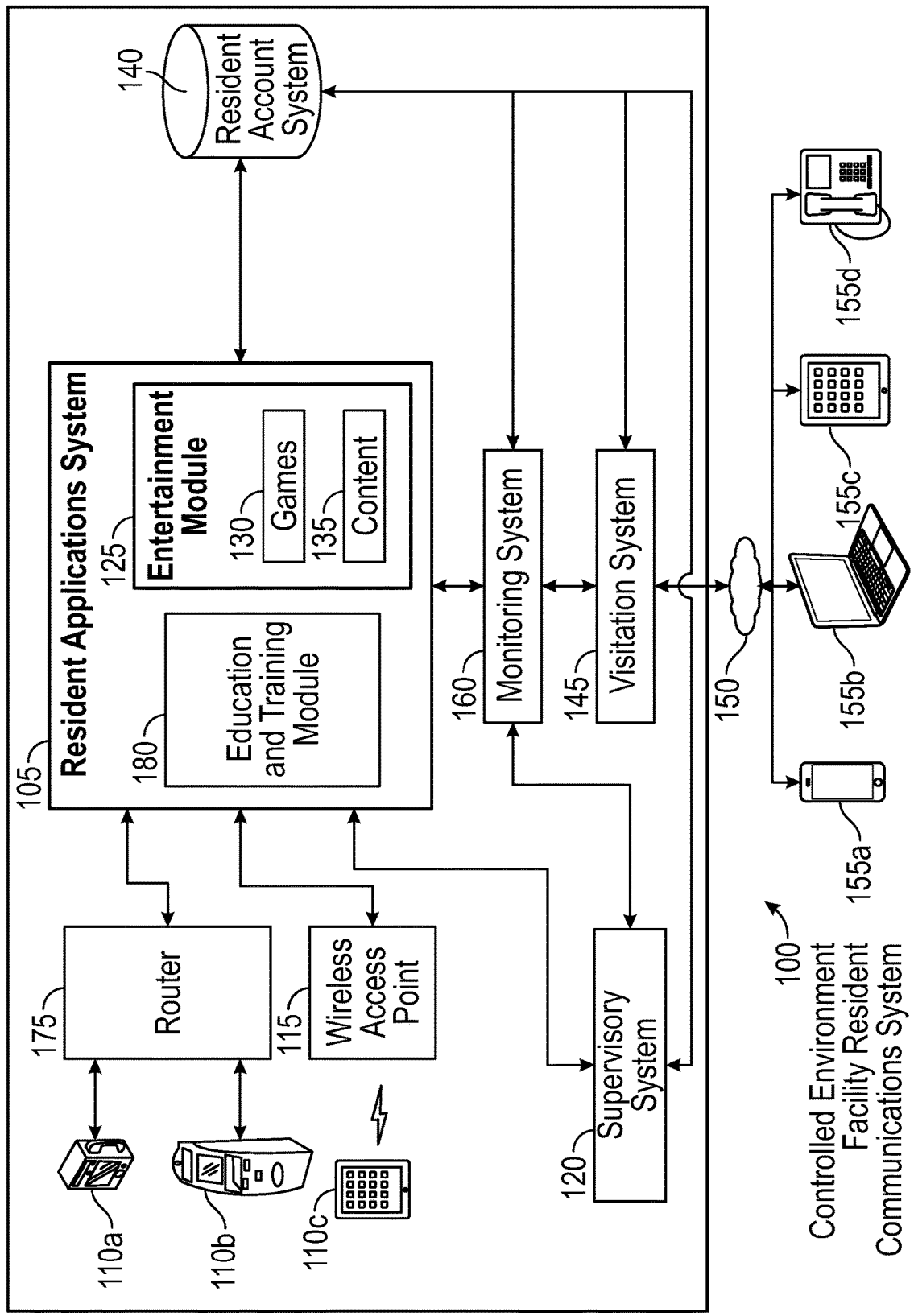

Having thus described the invention in general terms, reference will now be made to the accompanying drawings, which are not necessarily drawn to scale, and wherein:

FIG. 1 is a diagram illustrating certain components of a communication system for providing residents of a controlled-environment facility with regulated communication services according to various embodiments.

Figure 2:
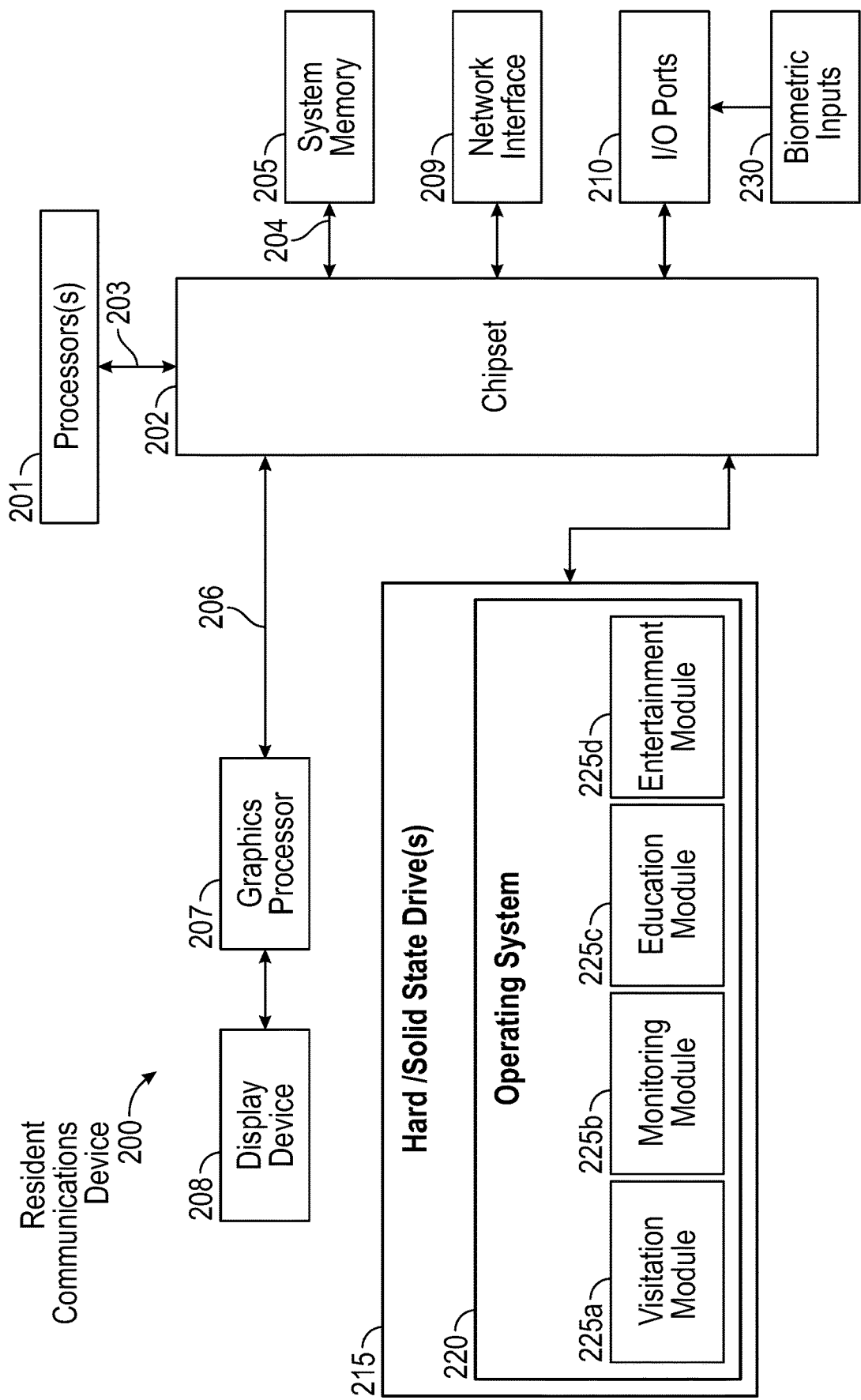

FIG. 2 is a diagram illustrating certain components of a resident device for providing residents of a controlled-environment facility with regulated communication services according to various embodiments.

Figure 3:
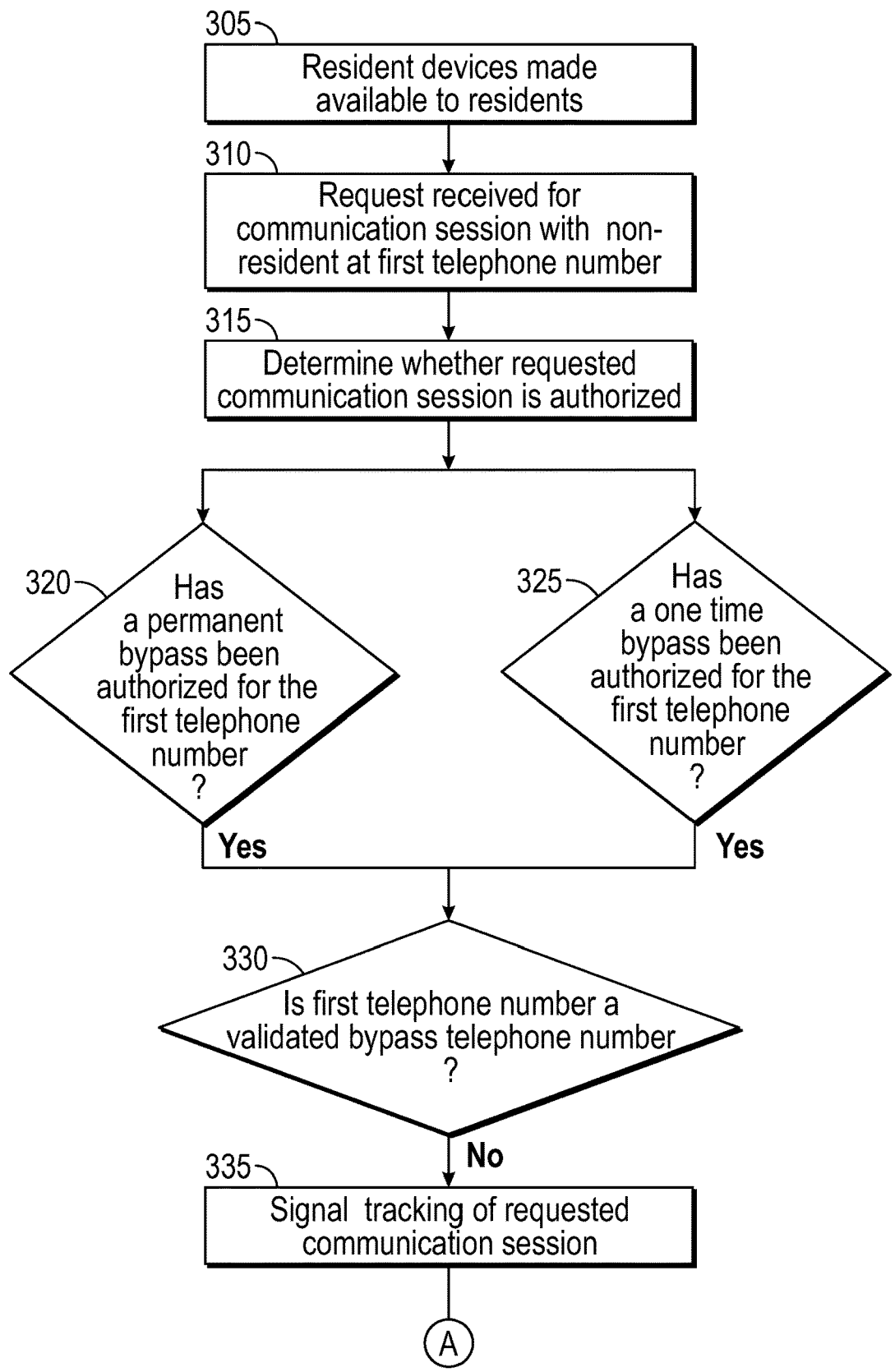
Figure 3:
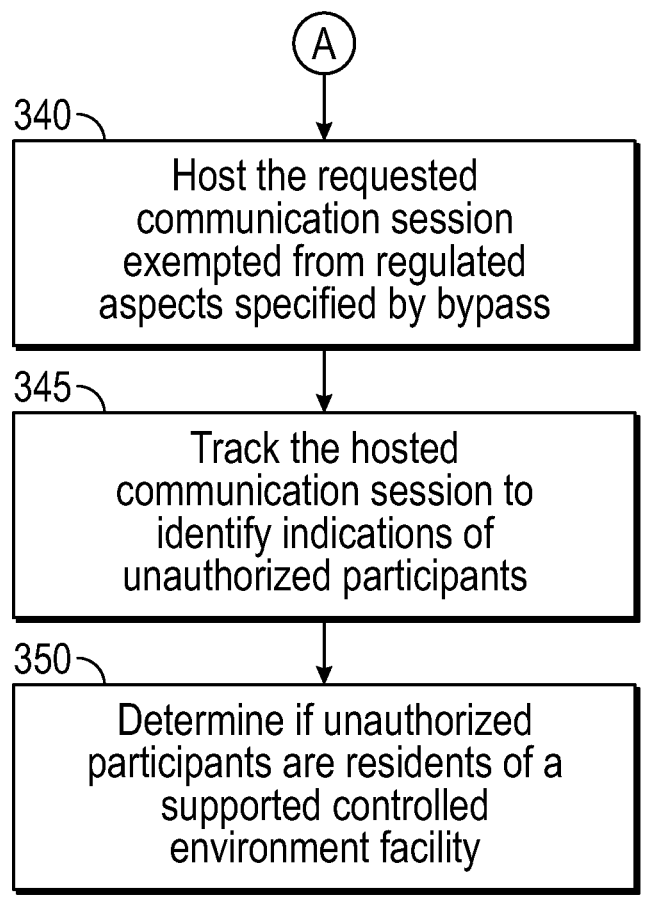

FIG. 3 is a flowchart diagram illustrating certain steps of process according to various embodiments for providing a resident of a controlled-environment facility with regulated communication services and detecting indications of fraudulent use of regulated communication services.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art would be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), certain healthcare facilities (e.g., certain hospitals and nursing homes, certain mental health facilities, certain rehabilitation facilities, such as drug and alcohol rehabilitation facilities, etc.), certain restricted living quarters (e.g., barracks, certain dormitories, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, offenders or detainees. It should be understood, however, that the systems and methods described herein may be similarly applicable to other types of controlled-environment facilities and their respective residents (e.g., a hospital and its patients, a school dormitory and its students, etc.).

FIG. 1 is a diagram illustrating certain components of a resident communications system 100 provided within a controlled-environment facility and configured according to various embodiments for providing residents with regulated communication services. In a controlled-environment facility, the resident communications system 100 may provide residents with a variety of services. In certain instances, the resident may utilize the services provided by the resident communications system 100 via a resident communications device 110*a-c*. In the illustrated embodiment, resident communications system 100 provides residents with regulated visitation session services via a visitation system 145, where the resident may utilize certain of these regulated visitation session services via supported resident communications devices 110*a-c*, that may include a resident terminal 110*a*, a resident kiosk 110*b* and/or a portable communications device 110*c*. As illustrated, resident communications system 100 also provides residents with access to a resident applications system 105 that interfaces with the resident communications device 110*a-c* in order to provide various approved software applications to the resident, such as educational, employment, visitation and entertainment software. In various embodiments, resident communications system 100 may provide residents with a variety of additional services via a resident communications device 110a-c.

In certain embodiments, resident communications system 100 may be located within a controlled-environment facility, and may be used to provide regulated communications services to residents located at that particular facility. Alternatively, resident communications system 100 may be centrally and/or remotely located with respect to one or more controlled-environment facilities and may be used to provide services to residents at multiple different facilities. Whether local to a particular controlled-environment facility or located remotely, resident communications system 100 may be used to provide regulated communication services to residents of multiple controlled-environment facilities.

One of the regulated services provided to residents by the resident communications system 100 may include monitored interactive sessions. For instance, in the illustrated embodiment, visitation system 145 allows a resident, using resident communications device 110a-c, to participate in a monitored visitation session with a non-resident participating via a personal communications device 155a-d that connects to the visitation system 145 via an external network 150, such as the Internet. In various embodiments, the visitation system 145 may provide residents with a selection of different visitation session formats including audio conferences, audio messages, video conferences, video messages, email, online chats and/or text messaging services. In certain instances, the visitation formats that are available to a resident may depend on factors such as: the capabilities of the resident communications device 110a-c, the resident's designated privilege and/or risk classification within the controlled-environment facility, and restrictions on types of visitations that are allowed with specific non-residents. In certain instances, the formats that are available for a visitation session may be authorized via a bypass authorization that allows a staff member of the controlled-environment facility to grant a visitation session and may specify the allowable formats for the granted visitation session.

In the illustrated embodiment, various components of the resident communications system 100 utilize the resident account system 140 in enforcing security protocols that are applicable to the use of services provided to residents of the controlled-environment facility. For instance, in providing visitation services, the visitation system 145 may determine applicable restrictions based on data stored in the resident account system 140. In certain embodiments, the visitation system 145 may interoperate with the resident account system 140 to limit a resident's visitation sessions to sessions with non-residents whose identities are listed in that resident's Pre-Approved Contact (PAC) and/or Personal-Allowed Number (PAN) list. In some scenarios, the visitation system 145 may also enforce restrictions prohibiting a resident from contacting certain individuals identified in a "do not contact" list. The identity of a non-inmate may be represented on these lists by the phone number of the non-resident, the device presented for use by a non-resident and/or the email addresses or other accounts used by the non-resident. Each resident's PAC, PAN, and/or do not contact list(s) may be stored by the resident account system 140. In certain scenarios, resident account system 140 may also be used to store biometric information used to authenticate individual residents of the controlled-environment facility and/or non-residents that have been authorized for certain visitation system 145 services. In addition to PAC, PAN, and/or do not contact list(s), resident account system 140 may also store other security profiles and rules that are applicable to each resident. In FIG. 1, resident account system 140 is illustrated as a single component. Various embodiments may utilize one or more database systems in implementing resident account system 140.

In certain embodiments, the resident account system 140 may be utilized in detecting fraudulent use of certain regulated communication services provided by the resident communications system 100. For instance, the resident account system 140 may store information identifying nonresidents for which a bypass authorization has been configured, where the bypass exempts communication sessions from certain regulations enforced on the provided services. Such a listing of bypass authorizations may identify individuals, telephone numbers, or other identifiers of a potential party to a communication session for which certain regulations are not enforced, either on a permanent or temporary basis.

As illustrated, the resident account system 140 may also include BNA (Billing Name and Address) information 140a for certain non-residents. In certain instances, BNA information 140a for non-residents may be determined during enrollment of the non-resident for communication sessions with residents via the resident communications system 100. BNA information 140a may also be obtained via queries to third-party database and based on payments made by non-residents for use of communication services provided by the resident communications system 100. As described in additional detail below, in certain embodiments, BNA information 140a may be utilized in order to identify non-residents that have been joined to an authorized bypass communication session, thus providing an indication of whether the joined individual is a recognized non-resident that is authorized to participate in bypass communication sessions.

The resident account system 140 may also be used to manage information such as balances in a resident's trust, commissary and/or visitation services accounts. The resident account system 140 may also provide access to other information pertaining to a resident, including for instance a resident's trial schedule, conviction data, criminal record, sentencing data (such as time served, time remaining to be served, and projected release date), counseling history, screening history, cell and cellmate assignments, resident-specific restrictions and warnings, commissary order history, telephone call history, call recordings, known or suspected gang or criminal affiliations, known or suspected affiliates, accomplices, or gang members, and any other information that may be relevant or useful to correctional facility staff to house and maintain residents. In various embodiments, the resident account system 140 may be one or more separate systems, or may be integrated as a component of the resident communications system 100.

Subject to various restrictions and limitations enforced by the visitation system 145, residents may participate in regulated visitation sessions with one or more non-residents 155a-d. Non-residents may utilize various communications devices in participating in visitation sessions. For instance, a non-resident may participate using a mobile phone 155a, a personal computer 155b, a tablet computing device 155c, a conventional telephone 155d, or other communications devices capable of interfacing with the visitation system 145. In certain scenarios, a non-resident may participate in a voice visitation session hosted by the visitation system 145 via a traditional telephone 155d via a Publicly Switched Telephone Network (PSTN) interface to the network 150. As described, various other visitation session formats may be supported by visitation system 145. Based on the hardware and software capabilities of the non-resident devices 155a-d, non-residents may participate in voice, video and/or text-based (e.g., text messages, chat, email, eMessaging) visitation sessions.

As described, resident communications system 100 includes a monitoring system 160 configured to perform various monitoring operations related to the resident's use of the regulated communication services provided by the system. In particular, the monitoring system may provide the ability to monitor a resident's use of software applications provided via the resident applications system 105. The monitoring system 160 may also include various tools for automated and manual monitoring of visitation sessions conducted via the visitation system 145. For instance, the monitoring system 160 may include tools that allow staff to monitor live and recorded visitation sessions. The monitoring system 160 may record the visitation sessions conducted via the visitation system 145, such as by generating written transcripts, audio and/or video files of visitation sessions. These recorded visitation sessions may be stored to a database maintained by the monitoring system 160. The monitoring system 160 may also provide tools that allow staff to mark and annotate events observed in a recorded visitation session. The monitoring system 160 may also provide tools that allow staff to search recorded visitation sessions in support of investigative activities. Additional monitoring may be provided by the monitoring system 160 via keyword detection, gesture recognition, and other tools intended to detect unauthorized or illicit behavior during a visitation session.

In certain embodiments, the monitoring system 160 may be configured to provide monitoring for various types of regulated interactive sessions in addition to visitation sessions. For instance, the monitoring system 160 may monitor a non-resident's interactive participation in an employment search and/or application session. For instance, as with a visitation session, the monitoring system 160 may monitor any audio or video streams utilized in a session. In addition, monitoring system 160 may monitor any text information shared between a resident and non-resident during an employment session. The monitoring system 160 may be similarly configured to monitor other interactive sessions such as gaming sessions. Any audio and video shared with a non-resident during a gaming session may be analyzed similar to a visitation session. In addition, any text comments shared during a gaming session, such as via a chat feature of a game, may also be analyzed by the monitoring system 160 for unauthorized activity.

In various embodiments, certain operations of the monitoring system 160 may be modified with respect to certain communication sessions hosted via the visitation system 145. In certain embodiments, supervisory system 120 may be used to modify the various operations of monitoring system 160. In certain instances, supervisory system 120 may provide capabilities by which a staff member may grant a bypass authorization on a one-time or a permanent basis, where the bypass authorization exempts communication sessions with a specified nonresident from various regulations enforced by the resident communications system 100.

In one embodiment, the supervisory system 120 allows a staff member to designate a specific telephone number, or other identifier, of a nonresident as permanently exempted from certain regulations. For instance, supervisory system 120 may allow a staff member to add telephone numbers of nonresidents to a list that identifies nonresidents for which communication sessions are exempted from certain regulations. In one example, a staff member may utilize supervisory system 120 to grant a bypass authorization for a telephone number of an attorney representing one or more nonresidents. Based on this bypass authorization, the monitoring system 160 exempts communication sessions to or from the telephone number from one or more regulations. For instance, as in communications with an attorney, such communications are privileged and thus exempt from various monitoring operations implemented by monitoring system 160. In certain scenarios, such attorney-client privileged communication sessions may be exempt from all monitoring system 160 operations other than logging details describing the timing and the participants.

This capability of the supervisory system 120 may be likewise used to specify various types of permanent bypass authorizations. For instance, a telephone number of a bail bondsman may be designated as a non-resident for which communication sessions are not charged, thus facilitating residents making bail. A telephone number for a mental health or addiction counselor may be designated as a permanent bypass authorization that is not subject to monitoring or recording due to confidentiality requirements. A telephone number for a clergy member or other religious official may be designated as a permanent bypass authorization also not subject to monitoring or recording.

In certain embodiments, the supervisory system 120 may be utilized to specify other types of identifiers, other than telephone numbers, for nonparties that have been granted permanent bypass authorizations. For instance, various educational and training sessions conducted via the education module 180 may be exempt from certain monitoring procedures. Certain online education and training sessions may allow a resident with limited capabilities for participation such that monitoring of such sessions is not required. In such instances, the web addresses of providers of such education and training sessions may be included on a listing of permanent bypass authorized Internet addresses that are subject to limited monitoring by monitoring system 160.

In addition to specifying permanent bypass authorizations, supervisory system 120 may allow staff members to grant one-time bypass authorizations to residents for specifically requested communication sessions. For instance, a staff member may be approached by a resident seeking an emergency communication session with a nonresident, such as due to a family emergency or illness. In response, the staff member may utilize features of the supervisory system 120 in order to authorize a one-time bypass authorization for a communication session to a telephone number or contact specified by the resident. Such bypass authorizations may allow the requested communications session to be conducted free of charge. A staff member may likewise authorize a one-time bypass authorization to a resident in distress. The one-time bypass authorization supported by the supervisory system 120 may likewise be used to authorize communications with attorneys, counselors, clergy, bail bondsman, and educational and training resources. As described with regard to permanent bypass authorizations, the one-time bypass authorization may exempt such communications from various regulations enforced by monitoring system 160.

In certain embodiments, resident communications device 110a-c may be a personal wireless device 110c, such as a tablet device or a smartphone device. As described in additional detail with regard to the embodiment of FIG. 2, the portable communications device 110c may include a camera, display, microphone and speakers and may allow the resident to participate in regulated interactive sessions supported by the resident communications system 100, where such interactive sessions may include voice calls, video conferences, email, online chats and/or text messaging services. In certain scenarios, a portable communications device 110c may be referred to as an Intelligent Resident Device (IRD), or in a correctional institution environment, as an Intelligent Inmate Device (IID). In certain scenarios, a portable communications device 110c may be sponsored, or otherwise subsidized, by organizations or companies that have contracted with the controlled-environment facility to provide services to residents of the facility.

The portable communications device 110c may be especially adapted in various manners for use in a controlled-environment facility. For instance, in a correctional facility, the portability of a portable communications device 110c may be limited by mounting or otherwise attaching the device on a wall, within a booth or as part of a kiosk. The portable communications device 110c may be assigned for use by a resident on a temporary or permanent basis. As described in additional detail with regard to the embodiment of FIG. 2, the portable communications device 110c may include various adaptations that prevent unauthorized use of the device by residents. Such adaptations may include various restrictions on the resident's use of regulated services provided by the resident communications system 100.

A portable communications device 110c may be restricted with respect to the network connectivity that may be provided by the resident communications system 100. In many scenarios, a portable communications device 110c may be configured to connect only to a specific wireless access point 115, or a specific network of wireless access points, provided by the resident communications system 100. In certain embodiments, a portable communications device 110c may be further restricted to connect only to networks available within certain areas of a controlled-environment facility, such as a dedicated visitation area or other supervised area. In certain scenarios, network connectivity for a portable communications device 110c may be limited by placing wireless access points 115 and positioning directional antenna within the physical structure of a controlled-environment facility such that the generated wireless signals are restricted to limited areas within the facility.

In certain embodiments, resident communications device 110a-c may be a resident terminal 110a. As with the portable communications device 110c, the resident terminal 110a may provide residents of a controlled-environment facility with regulated communication services, including voice, video and/or text interactive services. In certain scenarios, the resident terminal 110a may be mounted on a wall, within a booth, or as part of kiosk. In certain scenarios, the resident terminal 110a may be a hardened terminal and may be installed in an area of the controlled-environment facility 100 dedicated to providing residents with interactive sessions. In certain embodiments, resident terminal 110a may include a character-entry interface that allows data entry by residents and may allow residents to participate in text messaging or other text-based communication services. In certain embodiments, such a resident terminal 110a may be referred to as an Intelligent Facility Device (IFD).

In various embodiments, a resident terminal 110a may include a video display, a camera, and a handset that includes a microphone and speakers. The display may be any suitable electronic display such as, for example, a Liquid Crystal Display (LCD) or a touchscreen display (e.g., resistive, capacitive, etc.). The camera included on the resident terminal 110a may be any suitable imaging device such as, a video camera or webcam equipped with Charge-Coupled Devices (CCDs) or Complementary Metal-Oxide-Semiconductor (CMOS) active pixel sensors. A handset may be similar to a traditional telephone handset, including an earpiece portion (with a speaker), a hand held portion, and a mouthpiece portion (with a microphone). In certain embodiments, the resident terminal 110a may allow a resident to utilize a headset with earphones and a microphone in place of a traditional handset.

In certain embodiments, resident communications device 110a-c may be a resident kiosk 110b. As with the portable communications device 110c and the resident terminal 110a, the resident kiosk 110b may provide residents of a controlled-environment facility with regulated communication services including voice, video and/or text communications services. In certain scenarios, the resident kiosk 110b may be located within a booth or other visitation area. The resident kiosk 110b may be formed from a hardened enclosure. In certain embodiments, resident kiosk 110b may include a keyboard or other character-entry interface that allows data entry and participation in text-based communication services. As with the resident terminal 110a, a resident kiosk 110b may include a video display, a camera, a microphone and speakers that may provide residents with the ability to participate in interactive sessions supported by the resident communications system 100, where such interactive sessions may include voice calls, video sessions, email, online chats and/or text messaging services.

As illustrated in FIG. 1, the resident terminal 110a and resident kiosk 110b may be coupled to the resident applications system 105 via one or more routers 175. In other embodiments, the resident terminal 110a and resident kiosk 110b may be coupled to the resident applications system 105 via one or more additional network devices in addition to router 175. In certain embodiments, each resident terminal 110a and resident kiosk 110b may be coupled to a router 175 via a network cable, where the router 175 and network cable are secured from being accessed by residents.

As illustrated, the resident applications system 105 includes an education module 180 and an entertainment module 125. These modules include software applications provided for use by residents and which may be utilized via a resident communications device 110a-c. The education module 180 may be one of many different modules provided for the education and training of residents. For instance, the education module 180 may provide a resident with access to recorded lectures, online classes, coursework materials, self-guided training courses, vocational training materials, job counseling services, job search services, and other such resources provided with the intent to rehabilitate and educate residents. Certain aspects of the education and training module 180 may be configured for use within interactive sessions with non-residents.

In addition to providing access to educational and employment resources, the resident applications system 105 may include an entertainment module 125, by which entertainment software programs may be downloaded and run on a resident communications device 110a-c. In the illustrated embodiment, entertainment module 125 is comprised of a gaming module 130 and content module 135. The gaming module 130 may support the use of various games approved for residents of a controlled-environment facility. The entertainment module 125 also includes a content module 135 that may be used to provide residents with various forms of digital content, such as recorded videos, live broadcasts, music files, access to streaming audio, and other audio and video content approved for residents of a controlled-environment facility. In certain embodiments, aspects of the entertainment module 130 may allow interactive non-resident participation, such as via a software application installed on the personal device 110a-c of the non-resident.

For instance, the gaming module 130 may provide residents with access to games that support interactive participation by non-residents.

In the embodiment of FIG. 1, the resident application system 105 is a component of the resident communications system 100. In certain embodiments, the resident application system 105 may be an external component of the resident communication system 100. In certain embodiments, one or more of the functions of the resident application system 105 may be provided by systems external to the resident communications system 100. In certain of such embodiments, one or more of the functions of the resident application system 105 may be provided by centralized systems external to the controlled-environment facility.

FIG. 2 is a block diagram of a communications device 200 configured according to certain embodiments for use by a resident of a controlled-environment facility in utilizing regulated communication services provided to the residents. In various embodiments, the communications device 200 may correspond to a resident terminal 110a, a resident kiosk 110b, or a portable communications device 110c, such as described with respect to FIG. 1. In certain scenarios, the communications device 200, such as resident terminal 110a, resident kiosk 110b and portable communications device 110c, allows residents to utilize various regulated communication services provided by a resident communications system, such as described with respect to FIG. 1. The communications device 200 may be configured to interoperate with the resident communications system to utilize software applications that have been approved, and in some cases modified, for use by residents of a controlled-environment facility. Also as described with regard to FIG. 1, in certain embodiments, the resident communications system may be configured such that the resident may utilize the communications device 200 to utilize games and other entertainment content, education and training sessions and visitation sessions, including text, audio and/or video visitation sessions.

In various embodiments, the communications device 200 may be installed within a hardened enclosure that prevents any modifications to the hardware of the device and to prevent any tampering with the device that could allow a resident to conceal contraband within the device. In certain embodiments, the communications device 200 may be a tablet device, such as portable communications device 110c, that is protected within a hardened case that allows the resident to handle and use the portable device, but prevents the resident from accessing any of the device's internal components.

In certain embodiments, one or more sensors may be integrated into the communications device 200 in order to detect any such attempts to compromise the enclosure of the device. In certain embodiments, the communications device 200 may be configured to issue an alert to the resident communications system if the sensors indicate any attempts by a resident to compromise the enclosure of the device. In certain embodiments, the communications device 200 may be configured to shut down upon the sensors detecting an attempt to compromise the device, or in response to the sensors detecting sudden movements indicative of a resident's rough handling of the device. Various additional features of the hardware and/or software of the communications device 200 may be modified in order to prevent unauthorized use of the device.

Communications device 200 may include one or more processors 201. In various embodiments, the communications device 200 may be a single-processor system including one processor 201, or a multi-processor system including two or more processors 201. Processor(s) 201 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

Communications device 200 may include a chipset 202 that may include one or more integrated circuits that are connected to processor(s) 201. In certain embodiments, the chipset 202 may utilize a bus 203 for communicating with the processor(s) 201. Chipset 202 provides the processor(s) 201 with access to a variety of resources. For instance, chipset 202 provides access to system memory 205 over memory bus 204. System memory 205 may be configured to store program instructions and/or data accessible by processors(s) 201. In various embodiments, system memory 205 may be implemented using any suitable memory technology, such as static RAM (SRAM), synchronous dynamic RAM (SDRAM), nonvolatile/Flash-type memory, or any other type of memory.

Chipset 202 may also provide access to a graphics processor 207. In certain embodiments, graphics processor 207 may be comprised within a video or graphics card that has been installed as components of the portable communications device 200. Graphics processor 207 may be coupled to the chipset 202 via a graphics bus 206 such as provided by an AGP (Accelerated Graphics Port) bus or a PCIe (Peripheral Component Interconnect Express) bus. The graphics processor 207 generates display signals that are provided to a display device 208, such as a tablet display screen. In certain embodiments, the display device 208 may be a touchscreen display configured to receive manual inputs, such as finger gestures and/or stylus inputs.

The chipset 202 of the communications device 200 may also include one or more hard disk and/or solid-state drives 215. As illustrated, the operating system 220 of the communications device 200 may be stored in the hard disk and/or solid-state drive 215. The communications device 200 may be configured to operate using a specially-adapted operating system 220, or operating system kernel, that implements various security procedures, such as the authentication of the resident using a voice print, fingerprint or other biometric input recognition. The operating system 220 of the communications device 200 may also restrict the software applications and services that may be used by a resident. The operating system 220 may also be configured to prevent the resident from installing or modifying any applications on the device, thus limiting the resident to the use of software programs authorized for use by the resident communications system.

In certain embodiments, chipset 202 may be coupled to a network interface 209, such as provided by a Network Interface Controller (NIC). In certain embodiments, the network interface 209 may be coupled to the chipset 202 via a PCIe bus. As described, a communications device 200 such as portable communications device 110c, may be limited with regard to the network connectivity that is supported by the device. In such embodiments, the network interface 209 may be configured to restrict the wireless networks to which a portable communications device may be connected. For instance, network interface 209 may be a wireless network adapter that is configured to allow the communications device 200 to connect only to a specific wireless network provided by the resident communications system. In certain embodiments, network interface 209 may be configured to issue and alert notifying the resident communications system if any unrecognized wireless networks are detected by the communications device 200.

In many scenarios, use of a communications device 200 may be limited based on security protocols implemented by the resident communications systems. For instance, the operating system 220 of the communications device 200 may be configured to require a resident to enter a PIN (Personal Identification Number) assigned to the resident before enabling use of the communications device 200 by the resident. In other embodiments, the communications device 200 may likewise remain disabled until a resident trying to use the device is authenticated via a biometric verification. In certain embodiments, the communications device 200 may be configured to disable certain functions of the device or of the resident software applications installed on the device until the resident is authenticated, such as using voice print recognition of a voice sample provided by the resident in response to a prompt generated by the operating system 220. In the illustrated embodiment, the chipset 202 is configured to utilize I/O ports 210 that support biometric input devices 230, such as a fingerprint reader or a retinal scanner. In certain embodiments, the operating system 220 may boot upon initialization of the communications device 200, but may require authentication of the resident via biometric inputs 230 in order to enable the resident's use of the communications device 200.

In certain embodiments, a communication device 200, such as the resident terminal 110a, kiosk 110b or portable communications device 110c, may include an I/O port 210 input coupled to an RFID (Radio Frequency Identification) reader that is configured to detect RFID transponders worn by residents of the controlled-environment facility. The incorporation of the RFID reader into the communication device 200 provides the ability to authenticate an inmate using the communications device 200. In certain embodiments, the RFID reader may be configured to receive reports of biometric information collected from sensors included in the RFID transponder device worn by a resident.

As described with respect to FIG. 1, the resident communications system may support the use of resident applications, such as the education and training module 180 and entertainment module 125, which may be downloaded and run on the communications device 200. Referring to FIG. 2, upon booting of the communications device 200, and upon instantiation and execution of the operating system instructions 220 stored in the storage drive 215, the operating system 220 provides the resident with access to various software modules 225a-d. Each of the software modules 225a-d may be installed on the communications device 200, but may remain fully or partially disabled until the resident has been approved to use the restricted software components.

The software modules 225a-d supported by operating system 220 may include an education module 225c that may provide residents with access to various educational services and resources. These educational services and resources provided via the education module 225c may include various forms of instructional materials, course materials, self-guided learning exercises, access to online classes, training materials, and/or vocational training exercises. In various embodiments, the services provided via the education module 225c may provide residents with various types of resources that promote the education and training of the resident. The software modules supported by operating system 220 may also include an entertainment module 225d that may provide a resident with access to games and content, as described with respect to the entertainment services in FIG. 1.

The software modules supported by operating system 220 may also include a visitation module 225a that may provide the resident with the ability to participate in visitation sessions, such as the visitation sessions described with respect to FIG. 1. In certain embodiments, the visitation module 225a may provide residents with the ability to request, schedule and participate in visitation sessions, such as voice calls, text communications and video conferences. In such embodiments, the visitation module 225a may include user interface elements that allow the resident to interface with the visitation system 145 and the resident account system 140 in performing visitation functions such as requesting a visitation session, determining whether the requested visitation is allowed and scheduling a visitation session. The visitation module 225a may also include audio and video capabilities that allow the resident to participate in audio and video visitation sessions. Embodiments of the visitation module 225a may also enable residents to participate in other types of visitations, such as e-mail, text messaging and the exchange of voice and video messages.

As illustrated, the software modules supported by operating system 220 also include a monitoring module 225b that is utilized to monitor a resident's use of the communication device 200, and to detect unauthorized use of the communication device 200 by the resident. For instance, the monitoring module 225b may include capabilities for live monitoring of the resident via the camera and speaker of the communication device 200. The monitoring module 225b may also be configured to detect any attempts by the resident to alter or re-configure the communication device 200. The monitoring module 225b may also be configured to monitor and record various aspects of a resident's participation in a communication session, including recording the audio and/or video of a communication session.

As described, the supervisory system 120 of the resident communication system 100 may allow a staff person of a controlled-environment facility to authorize communication sessions that bypass one or more of the monitoring procedures implemented by monitoring module 225b. For instance, in a scenario where a staff person has authorized a bypass communication session on the basis that the communication by the resident will be with an attorney and the communication is a privileged communication, all or some of the capabilities of the monitoring module 225b may be temporarily disabled during the authorized bypass communication session.

Once a resident using the communication device 200 has been properly authenticated, the resident may utilize features of the operating system 220 to request access to the supported software modules. In certain embodiments, the operating system 220 may connect the resident to the resident applications system 105 of FIG. 1 in order to authorize a resident's use of a requested module or feature, and in certain scenarios, to download software necessary to provide the resident's requested use of the communication device 200. In various embodiments, a communications device 200 does not include each of the components shown in FIG. 2.

In various embodiments, communications device 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 201 as a system-on-a-chip.

FIG. 3 is a flowchart diagram illustrating certain steps of a process for providing residents of a controlled-environment facility with regulated communication services according to various embodiments. In the illustrated embodiment, the process begins at step 305 with resident devices being made available to the residents of a controlled environment facility. As described with regard to FIGS. 1 and 2, resident devices may include a personal wireless device, a resident terminal or a kiosk. In certain scenarios, the resident device may be made available to a resident on a temporary basis. For instance, during scheduled visitation session availability, residents may be provided temporary access to designated visitation areas that include resident terminals, kiosks, personal wireless devices, or other resident devices. In other scenarios, a resident may be provided a personal wireless device, such as a tablet, on a more permanent basis. In some scenarios, the resident may be allowed to utilize a personal wireless device in private, while other scenarios may require a resident to utilize a personal wireless device within a designated area. In certain scenarios, the personal wireless device may be assigned to the resident, but various function and capabilities of the device may remain disabled while the device is outside of a designated area of the controlled-environment facility.

At step 310, a request for a communication session may be received from a resident operating one of the resident devices that has been made available to the residents. As described, the resident device may interoperate with a visitation system in order to allow a resident to participate in interactive visitation sessions, such as voice calls and video conferences, with one or more nonresidents. In certain scenarios, the request from the resident may specify a telephone number for the nonresident with which a communication session is sought by the resident. In other scenarios, the request from the resident may specify the identity of the nonresident, which may be used to determine a telephone number for the nonresident within contact information maintained in the resident account system 140 for each resident.

The request for the communication session with the nonresident is evaluated at step 315 in order to determine whether the communication session is authorized. In certain scenarios, the resident may be prohibited from contacting a specific nonresident or may be limited to communications with only specific, preapproved nonresidents. In other scenarios, a resident may be allowed communication sessions with nonresidents only during certain time intervals. For instance, limitations on bandwidth and/or monitoring resources may limit the number of concurrent visitation sessions that may be supported by the resident communications system. Accordingly, even though resident devices are available to a resident, communication sessions may only be allowed to residents during specific visitation intervals. In certain embodiments, the nonresidents may be identified, and authorization determined, based on BNA (Billing Number and Address) information maintained by the resident communication system.

If the requested communications session is authorized, any bypass authorizations associated with the requested communications session are determined. At step 320, it is determined whether the telephone number, or other identifier, associated with the non-resident has been authorized with a permanent bypass. As described above, embodiments may provide a supervisory system by which a staff member of a controlled environment facility may grant a permanent bypass authorization for a specific telephone number. For instance, the staff member may grant such a permanent bypass authorization to the telephone number of an attorney representing one or more residents of the controlled environment facility, such that communication sessions with the attorney may be privileged and thus not subject to monitoring procedures. In another scenario, a staff member may grant a permanent bypass authorization to an Internet domain associated with an online learning facility, thus exempting a resident's participation in online instructional sessions from certain monitoring procedures and exempting these online instructional sessions from procedures that record and archive a resident's participation in a communication session.

At step 325, the existence of a one-time bypass authorization for the telephone number, or other identifier, associated with the nonresident is determined. As described above, the supervisory system may include a capability for a staff member of a controlled-environment facility to grant a one-time bypass authorization in response to a communication session request. In certain scenarios, the controlled-environment facility may provide staff members with discretion in granting one-time bypass authorizations to residents. As described above, the supervisory system may allow a staff person to manually authorize a one-time bypass authorization in response to a request from a resident, thus allowing a communication session that is exempted from certain regulations. In certain embodiments, an alert may be issued in response to the detection of a one-time bypass being authorized by a staff member. The generated alert may result in immediate alert notifications provided in supervisory components of the monitoring system that may be located at the controlled-environment facility, thus providing a notification to the staff member's supervisors, or such alert notifications may be provided within a centralized supervisory system.

For instance, a resident may notify a staff person of a family emergency or other such event that provides a basis for allowing the resident an impromptu communication session with family. In such scenarios, a staff person may grant a one-time bypass authorization that exempts the resident from one or more regulated aspects of communication sessions provided to residents. For instance, the one-time bypass authorization may exempt the resident from having to pay any fees associated with the requested communications session. The bypass authorization may also exempt the communication session from certain monitoring requirements, thus allowing requested communications session to proceed, regardless of the availability of monitoring resources. In certain scenarios, a staff person may grant a juvenile resident with an additional communication session via a one-time bypass authorization based on observed emotional distress that may be ameliorated by a communication session with family members. In another scenario, a staff person may grant a one-time bypass authorization for a privileged telephone conversation with an attorney.

If a permanent or one-time bypass authorization is identified for the telephone number of the nonresident in steps 320 and 325, at step 330, the telephone number or other identifier of the nonresident is validated against a list of telephone numbers or other identifiers that have been approved and verified as legitimate bypass authorization parties. In certain embodiments, the nonresident may be identified and validated based on BNA information maintained by the resident communication system. For instance, in response to a bypass authorization that is based on the understanding that a provided telephone number is associated with an attorney and communications via the provided telephone number are privileged, such provided telephone numbers may be compared against a list of known and previously validated telephone numbers that are associated with attorneys. Similarly, communication sessions between a resident and a mental health counselor may be authorized via a bypass and the provided telephone number may be compared against a list of known mental health counselors.

If the provided telephone number cannot be identified as an authorized bypass participant, at step 335, tracking of the requested communication session is signaled. As described in regard to the embodiment of FIG. 1, a monitoring system may include capabilities for tracking a requested communications session in order to determine whether additional participants have been included in the communication session. In the illustrated embodiment, such tracking is signaled for all bypass authorizations to telephone numbers that cannot be identified as previously validated nonresidents. In certain embodiments, tracking may be periodically or randomly signaled for all bypass authorizations, regardless of whether the telephone number of the nonresident is validated at step 330. In this manner, all permanent bypass authorizations may be periodically re-validated.

In certain embodiments, a permanent or one-time bypass authorization that cannot be identified as associated with an authorized bypass participant, the bypass authorization may be denied. The bypass authorization may be denied based on the frequency or volume of bypass authorizations that have been authorized by a staff member and/or within a portion of facility, such as a wing or pod. The bypass authorization may be denied based on the privilege and/or risk classification of the resident within the controlled-environment facility. For instance, a bypass authorization may be denied based on a suspension status of the resident, a group affiliation of the resident and/or a location of the resident within the facility, such as a location within the facility with limited video monitoring. In certain instances, denied authorizations may result in the requested communication session, as well as the resident and/or the staff member, being added to a list of suspect communication sessions that may be used in determining whether to allow and/or monitor future bypass authorizations.

At step 340, the resident communications system hosts the requested communication session between the resident and the nonresident and does so while exempting the communication session from the one or more regulated aspects specified by the bypass authorization. In this manner, the bypass authorization itself may be honored, while still investigating whether the bypass authorization is being misused. For instance, a bypass authorization granted for a purportedly privileged communication session with an attorney may be tracked, while still exempting the communications session from monitoring, and in some cases, from payment and archiving requirements.

Upon the requested communication session being initiated, at step 345, the hosted communication session may be tracked in order to determine any indications of unauthorized participants being joined to the communication session. In certain scenarios, bypass authorizations may be fraudulently used to allow a resident to communicate with prohibited individuals in a clandestine manner. For instance, a one-time bypass authorization may be granted by a staff member on the premise that provided phone number belongs to an attorney and authorized communication session is a privileged attorney-client communication. However, if the provided telephone number is instead the telephone number of a criminal associate, the bypass authorization provides an opportunity for a resident to participate in an unmonitored communication session with a prohibited individual in potential criminal activity. A staff member may be unwittingly convinced to provide such a bypass authorization, or may do so in collusion with the resident. In such scenarios, the provided telephone number is of a criminal associate of the resident, rather than an attorney, and would thus not be located in a list of authorized attorney bypass telephone numbers at step 330, such that the communication session would be signaled for tracking at step 335, and the hosted communication session would be tracked at step 345 to determine the actual identity of the non-resident participant.

In another scenario, a one-time or permanent bypass authorization may be fraudulently used to allow a resident to communicate with prohibited individuals. For instance, a provider of legitimate services to residents, such as a bail bondsman, may be granted a bypass authorization so that residents may make a free telephone call to arrange for bail. However, in certain instances, a fraudulent bail bondsman may bridge the telephone calls from the resident with calls from various nonresidents, thus allowing the resident to participate in communications sessions with unknown individuals and at no charge. In such scenarios, the fraudulent bail bondsman may be added to a list of authorized bypass nonresidents by a staff member that may have no knowledge of the bail bondsman's fraudulent activities. In this manner, a service provider may utilize the bypass authorization mechanism to facilitate communication sessions that circumvent the regulations enforced by the resident communication system. Accordingly, tracking such communication sessions provides an opportunity to determine whether the authorized bypass is being used as a conduit for unauthorized communication sessions.

At step 345, a bypass-authorized communication session hosted by the visitation system 145 of FIG. 1 may be tracked in order to identify unauthorized participants being joined to the communication session. As described, a non-resident that is authorized to participate in bypass communications may join other parties to the bypassed communication session. In some scenarios, a resident may be prohibited from communicating with these other parties joined to the bypass communication session. In certain embodiments, bypass communications may be tracked by determining whether the communication is being re-routed to another device. For instance, the non-resident may bridge other participants into the bypass communication session, such as via a conference call. In other scenarios, the non-resident may forward the bypass communication session to another device. In certain scenarios, such actions by a non-resident may be legitimate, such as an attorney hosting a conference call with an inmate and additional members of their legal team. In certain instances, identification of actual fraudulent use of bypass communication sessions may be accomplished through identification of the parties and/or devices that have been joined to a bypass communication.

In certain embodiments, the participation of joined parties in a bypass communication session may be identified by utilizing SIP (Session Initiation Protocol) tracking of any changes in the number of hops in the SIP messages used to provision and host the bypass communication session. An initial number of hops may be detected upon initialization of the bypass communication session with the non-resident. However, if more hops are later detected in the SIP messages that comprise the bypass communication session, this provides an indication that the SIP messages are now being re-routed by the non-resident and additional parties have been joined to the session. Other embodiments, may utilize additional or different SIP features and queries for detecting additional parties being joined to the bypass communication session.

In certain embodiments, the tracking of SIP messages used to provision and host a bypass communication session may include identifying information that may be matched against BNA information maintained for nonresidents by the resident communications system. Such BNA information may be utilized to determine whether a party that has been joined to the bypass communication session is a recognized individual and/or is utilizing a recognized communication device. As described, an attorney representing a resident may be granted a bypass communication session with the resident, but the attorney my join an associate to the communication session. Based on SIP information detected in packets from this joined party, the phone number of the party may be determined and matched to a BNA entry identifying the party as a known attorney. In this manner, the validity of the parties joined to a bypass authorization may be verified.

Such techniques provide indications of additional parties being joined to the communication session without violating the bypass authorizations. For instance, in a bypass communications session that has been authorized as privileged, the communication session may be hosted without any capability for monitoring the communications therein and thus without violation of attorney-client privilege. Accordingly, at step 340, the bypass communication session is hosted according the exemptions that have been authorized for the session. If indications of additional parties are detected, the joined parties may be identified to various degrees during the hosted communication session. In certain embodiments, SIP queries may be utilized to elicit responses from all devices participating in the hosted communication session. In certain instance, devices that have been identified as being joined to the communication session may then be identified as authorized for participating in a bypass communication session. In other instance, identified devices may instead be identified as belonging to individuals that are prohibited from communicating with the resident.

At step 350, the identified devices may also be identified as participating from a controlled environment facility. In certain scenarios, a bypass authorization may be used by a non-resident to join calls by two residents that may be in the same or different controlled-environment facilities. In detecting such scenarios, the termination of a hosted bypass authorization session at a controlled-environment facility communications system indicates the bypass authorization is being used to join communication sessions by two residents.

In certain embodiments, if tracking indicates unauthorized participation in the communication session, the session may be logged and reported as a suspicious communication session and the participants may be similarly reported as suspicious participants. In certain instances, communication session may be similarly logged and reported as suspicious based on the volume and/or frequency of bypass authorizations granted by a particular staff member and/or by staff members operating within a particular area of a controlled-environment facility. In certain instances, a communication session may be manually marked as suspicious based on monitored activity of the resident, including observations of the resident made either directly or via video monitoring. Such reports may be periodically generated and distributed to supervisory staff. Such reports may identify staff members at individual facilities that have authorized suspect bypass authorizations and may additionally identify particular staff members that have a high volume and/or frequency of bypass authorizations in general, or for a particular resident, or for a particular group affiliation of residents. In response to such reports, supervisory staff may be allowed the option to configure alerts that will provide an indication of any future detected bypass authorizations by a particular staff member or within a certain area of a facility. In certain embodiments, a centralized system may generate reports indicating potential fraudulent use of bypass authorizations across multiple different facilities. In certain instances, the data used to generate such reports may be queried and searched by supervisory staff.

The foregoing has outlined rather broadly the features and technical advantages of the present invention in order that the detailed description of the invention that follows may be better understood. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A system for providing a resident of a controlled-environment facility with regulated communication services, the system comprising:
    a plurality of resident devices available to the resident, wherein the resident devices may host regulated communication sessions between the resident and a plurality of non-residents;
    a supervisory system configurable to authorize or deny a bypass requested by a staff member of the controlled-environment facility of a plurality of regulated aspects of communication sessions supported by a resident communications system based on the frequency or volume of authorization requests by requesting staff member; and
    the resident communications system configured to:
        receive a request for a communication session from the resident operating a resident device;
        authorize use of the resident device by the resident for a communication session with a non-resident at a first telephone number;
        determine if the requested communication session is authorized by a bypass authorization, wherein the bypass authorization exempts the requested communication session from one or more of the regulated aspects of the regulated communication sessions; and
        if the requested communication session is authorized by a bypass, host the requested communication session and signal tracking of the communication session; and
    a monitoring system configured to track the communication session by determining whether telephone numbers other than the first telephone number are joined to the communication session.

2. The system of claim 1, wherein the supervisory system may authorize a bypass for a single call to the first telephone number.

3. The system of claim 1, wherein the supervisory system may authorize a bypass for all calls to the first telephone number.

4. The system of claim 1, wherein the one or more regulated aspects of communication sessions that may be bypassed include recording the communication sessions.

5. The system of claim 1, wherein the one or more regulated aspects of communication sessions that may be bypassed include monitoring the content of the communication sessions.

6. The system of claim 1, wherein the one or more regulated aspects of communication sessions that may be bypassed include requiring fees for the communication sessions.

7. The system of claim 1, wherein the monitoring system is further configured to determine if any other hosted communications sessions concurrently hosted by the resident communications system are joined to the communication session.

8. A method for providing a resident of a controlled-environment facility with regulated communication services, the method comprising:
providing a plurality of resident devices to the resident, wherein the resident devices may host regulated communication sessions between the resident and a plurality of non-residents;
authorizing or denying, by a supervisory system, a bypass requested by a staff member of the controlled-environment facility of a plurality of regulated aspects of communication sessions supported by a resident communications system based on the frequency or volume of authorization requests by requesting staff member;
receiving, by the resident communications system, a request for a communication session from the resident operating a resident device;
authorizing, by the resident communications system, use of the resident device by the resident for a communication session with a non-resident at a first telephone number;
determining, by the resident communications system, if the requested communication session is authorized by a bypass authorization, wherein the bypass authorization exempts the requested communication session from one or more of the regulated aspects of the regulated communication sessions;
if the requested communication session is authorized by a bypass, hosting, by the resident communications system, the requested communication session and signaling tracking of the communication session; and
tracking, by a monitoring system, the communication session by determining whether telephone numbers other than the first telephone number are joined to the communication session.

9. The method of claim 8, wherein the supervisory system may authorize a bypass for a single call to the first telephone number.

10. The method of claim 8, wherein the supervisory system ay authorize a bypass for all calls to the first telephone number.

11. The method of claim 8, wherein the one or more regulated aspects of communication sessions that may be bypassed include recording the communication sessions.

12. The method of claim 8, wherein the one or more regulated aspects of communication sessions that may be bypassed include monitoring the content of the communication sessions.

13. The method of claim 8, wherein the one or more regulated aspects of communication sessions that may be bypassed include requiring fees for the communication sessions.

14. The method of claim 8, further comprising:
determining, by the monitoring system, whether any other hosted communications sessions concurrently hosted by the resident communications system are joined to the communication session.

15. A plurality of computer-readable storage devices having program instructions stored thereon for providing a resident of a controlled-environment facility with regulated communication services, upon execution by one or more processors, the program instructions cause the one or more processors to:
authorize or deny based on the frequency or volume of authorization requests by a requesting staff member of the controlled-environment facility, via a supervisory system, a bypass requested by the staff member of a plurality of regulated aspects of communication sessions supported by a resident communications system providing a plurality of resident devices to the resident, wherein the resident devices may host regulated communication sessions between the resident and a plurality of non-residents;
receive, by the resident communications system, a request for a communication session from the resident operating a resident device;
authorize, by the resident communications system, use of the resident device by the resident for a communication session with a non-resident at a first telephone number;
determine, by the resident communications system, if the requested communication session is authorized by a bypass authorization, wherein the bypass authorization exempts the requested communication session from one or more of the regulated aspects of the regulated communication sessions;
if the requested communication session is authorized by a bypass, host, by the resident communications system, the requested communication session and signaling tracking of the communication session; and
track, by a monitoring system, the communication session by determining whether telephone numbers other than the first telephone number are joined to the communication session.

16. The computer-readable storage device of claim 15, wherein the supervisory system may authorize a bypass for one or more of: a single call to the first telephone number and all calls to the first telephone number.

17. The computer-readable storage device of claim 15, wherein the one or more regulated aspects of communication sessions that may be bypassed include recording the communication sessions.

18. The computer-readable storage device of claim 15, wherein the one or more regulated aspects of communication sessions that may be bypassed include monitoring the content of the communication sessions.

19. The computer-readable storage device of claim 15, wherein the one or more regulated aspects of communication sessions that may be bypassed include requiring fees for the communication sessions.

20. The computer-readable storage device of claim 15, wherein the program instructions cause the one or more processors to determine, by the monitoring system, whether any other hosted communications sessions concurrently hosted by the resident communications system are joined to the communication session.

* * * * *